Sept. 5, 1939.　　A. G. F. KUROWSKI　　2,171,703
TYPEWRITING MACHINE
Filed July 7, 1937　　6 Sheets-Sheet 1
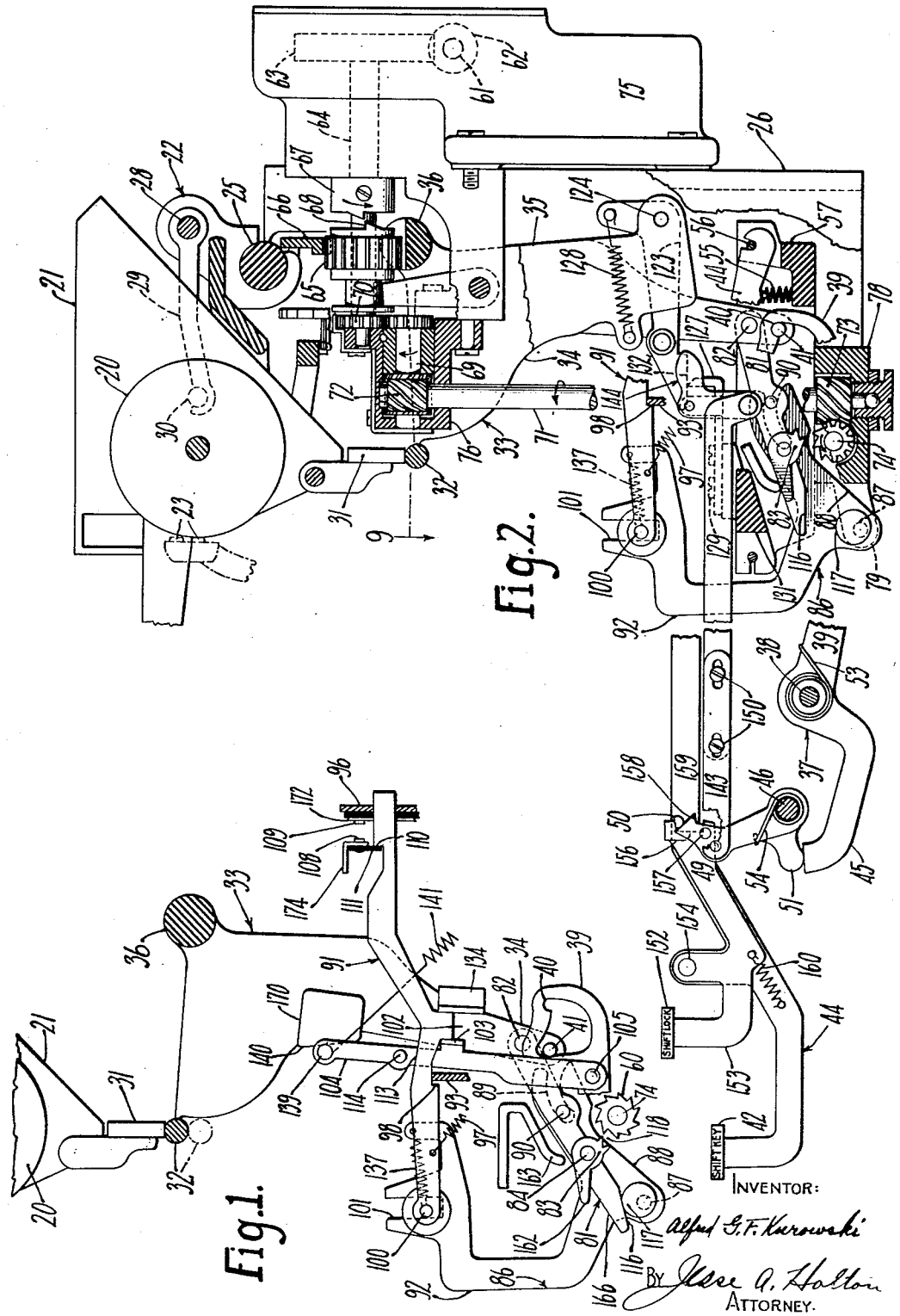

Sept. 5, 1939.  A. G. F. KUROWSKI  2,171,703
TYPEWRITING MACHINE
Filed July 7, 1937  6 Sheets-Sheet 2
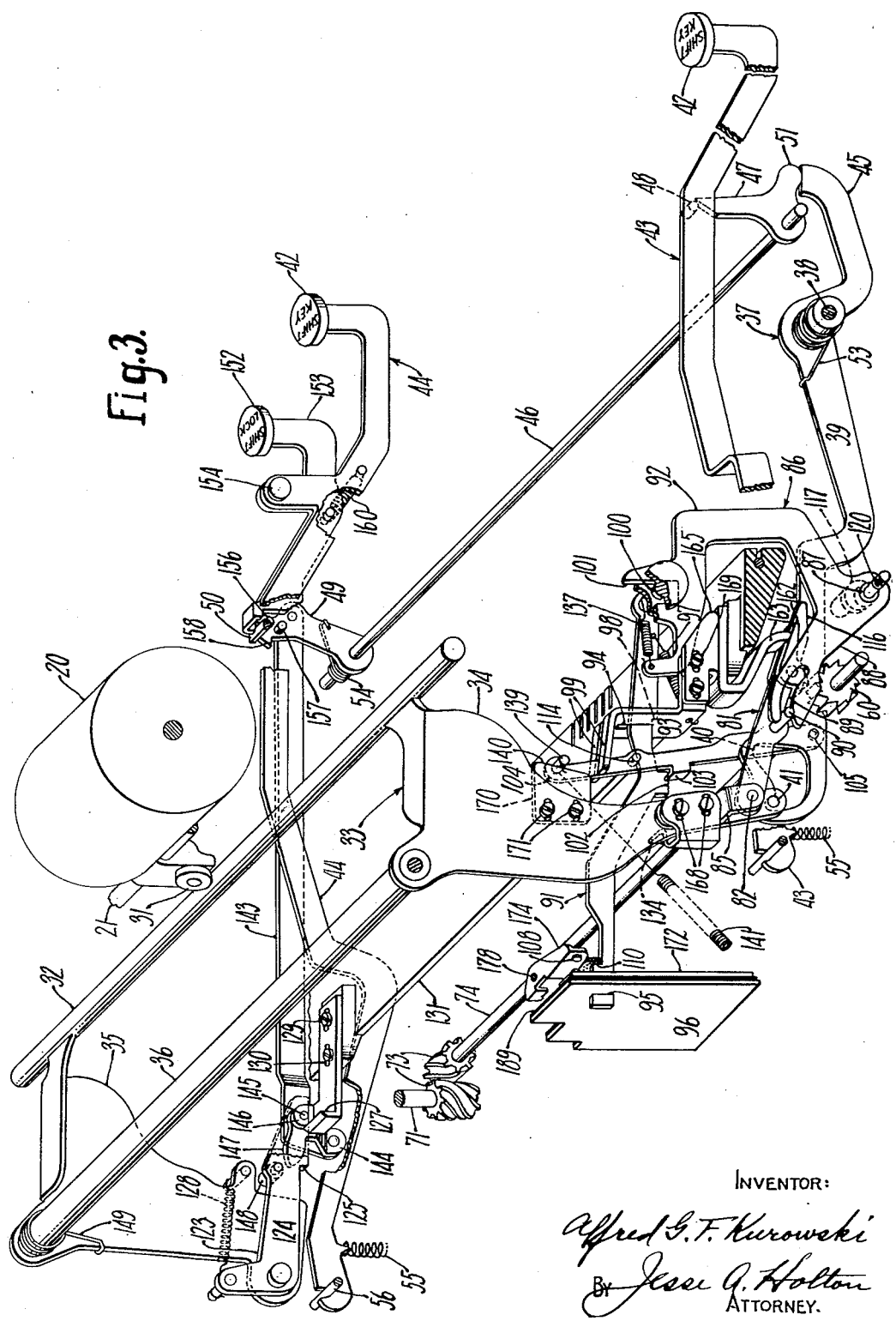
INVENTOR:
Alfred G. F. Kurowski
By Jesse G. Holton
ATTORNEY.

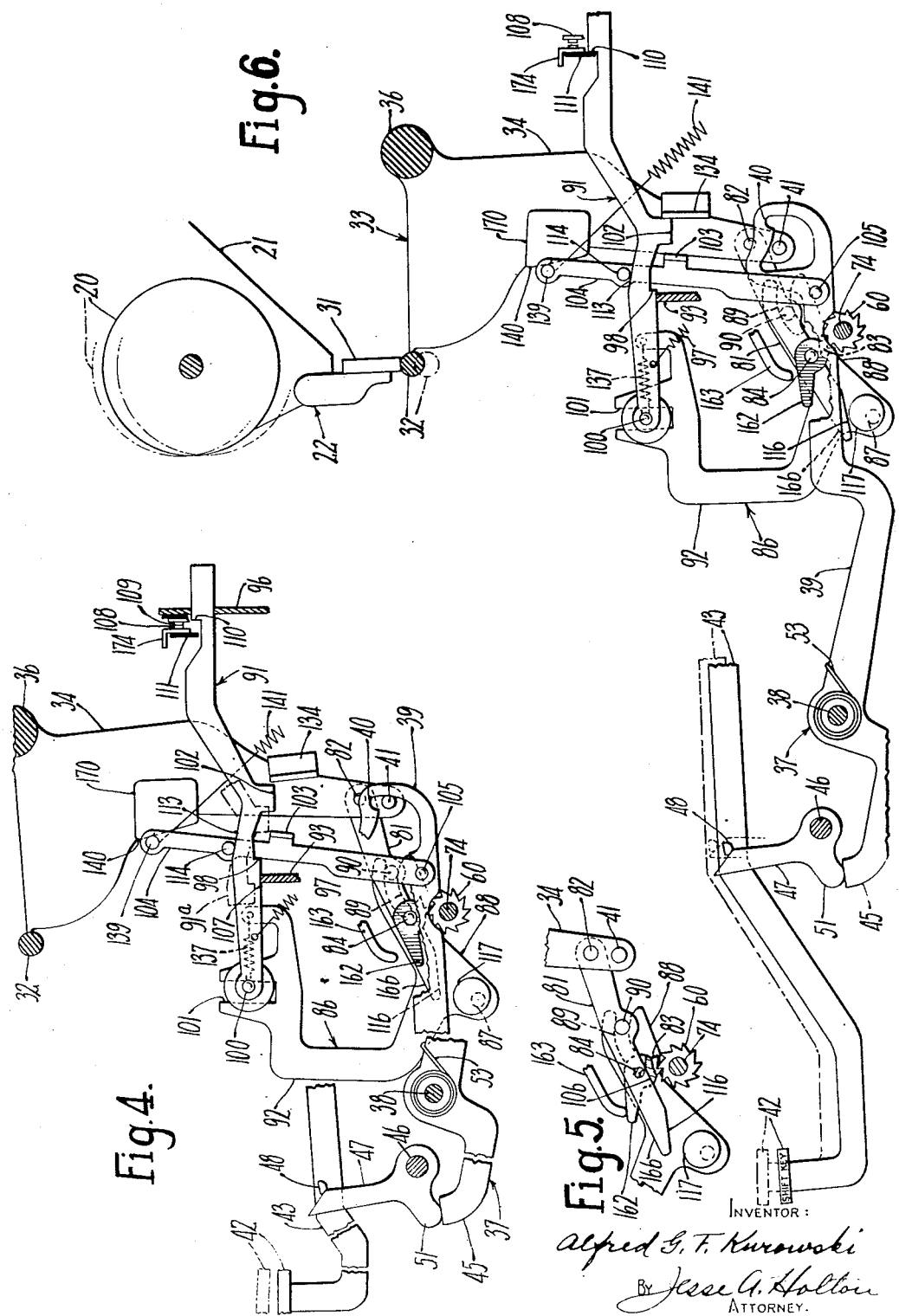

Sept. 5, 1939. A. G. F. KUROWSKI 2,171,703
TYPEWRITING MACHINE
Filed July 7, 1937 6 Sheets-Sheet 4
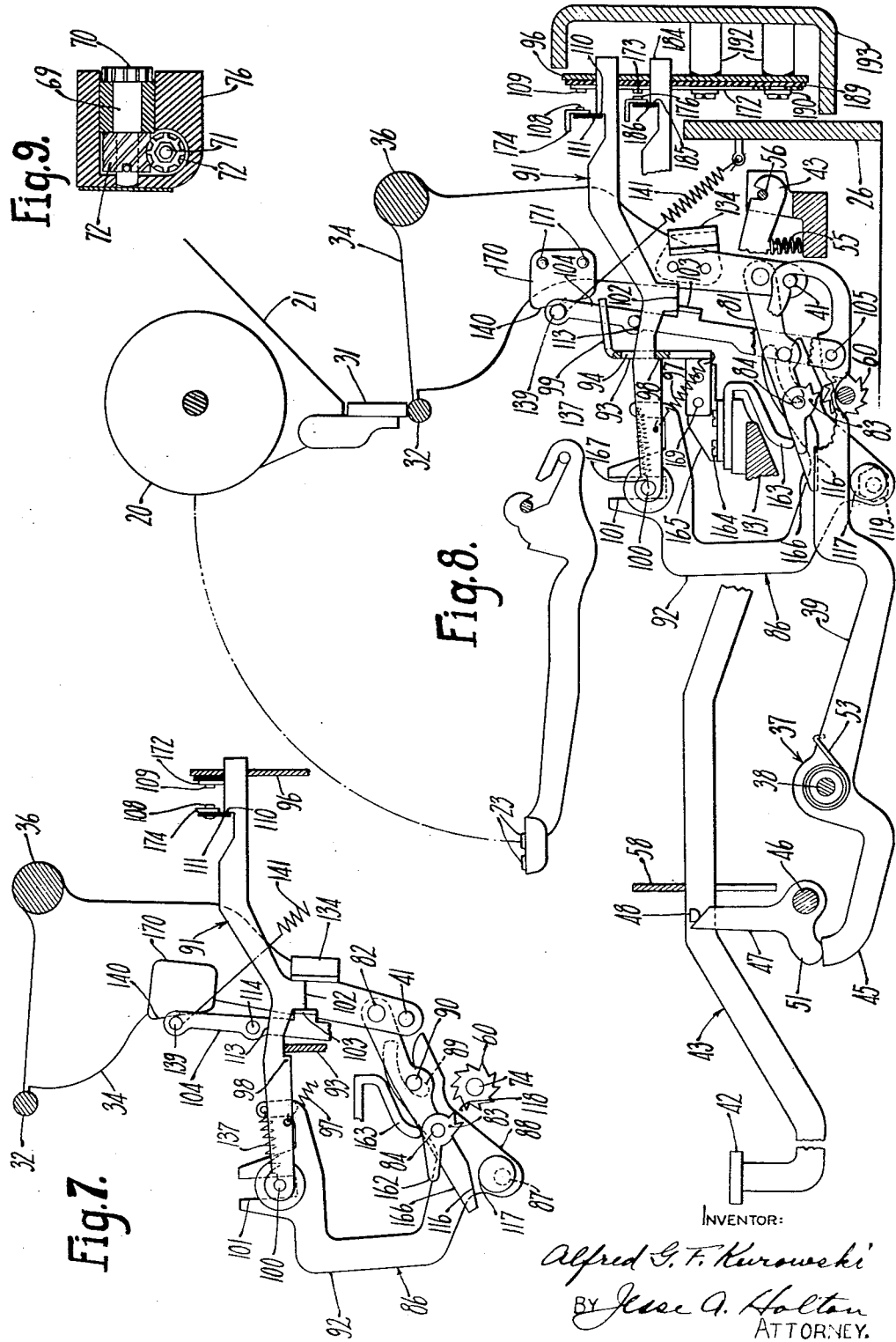
INVENTOR:
Alfred G. F. Kurowski
BY Jesse A. Holton
ATTORNEY.

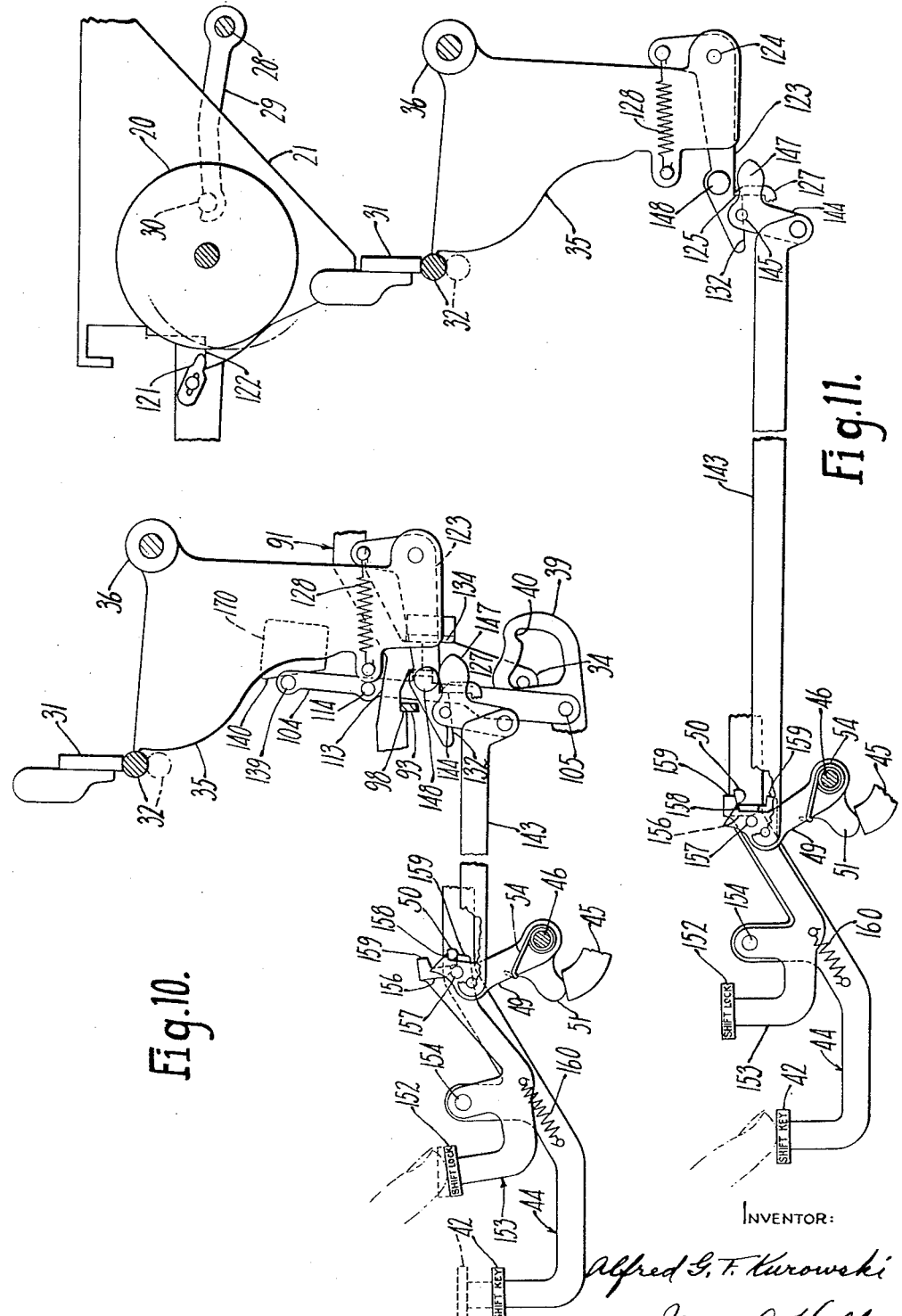

Sept. 5, 1939.　　A. G. F. KUROWSKI　　2,171,703
TYPEWRITING MACHINE
Filed July 7, 1937　　6 Sheets-Sheet 6

INVENTOR
Alfred G. F. Kurowski
BY Jesse A. Holton
ATTORNEY

Patented Sept. 5, 1939

2,171,703

UNITED STATES PATENT OFFICE 2,171,703

TYPEWRITING MACHINE

Alfred G. F. Kurowski, Brooklyn, N. Y., assignor to Underwood Elliott Fisher Company, New York, N. Y., a corporation of Delaware Application July 7, 1937, Serial No. 152,310

19 Claims. (Cl. 197—73)

This invention relates to power-operable case-shift mechanism for typewriters, and aims to provide a mechanism which will be unfailingly dependable in operation, and easily applicable to existing forms of typing machines, such as the Underwood exemplified in my Patent 1,679,727, dated August 7, 1928.

A power-operated mechanical driver, preferably a rotary snatch-roll or disk, is employed for mechanically effecting, in response to operation of a case-shift key, a relative case shift of the platen and types.

A coupler is connected to the case-shiftable part or frame and is movable from a normal initial position, in which it is withdrawn from said snatch-roll, to a snatch-roll-engaging position. The coupler and snatch-roll co-operate to effect a shift from normal case; said frame automatically becoming sustained in upper case by a detent-device, and being releasable therefrom, whereupon it is returned, as by a spring or gravity, to lowercase position. The coupler is driven by the snatch-roll in one direction to case-shift said frame, and, by the end of the case shift, becomes disconnected from said snatch-roll, and later is returned with said frame, independently of the snatch-roll, to its said normal initial position.

A feature of the invention resides in provision for releasably latching such coupler in said normal initial position and having it tend, as by means of a spring, to move to said snatch-roll-engaging position. The case-shift key, instead of moving the coupler directly, simply releases it from its latch-device, so that said spring takes over the function of moving said coupler into assured engagement with the snatch-roll. The coupler and snatch-roll form a normally open driving connection between the motor and case-shiftable part or shift-frame.

A rebound-preventing lock locks the shift-frame in its lower-case or normal position; and a further feature of the invention resides in interconnecting said lock and coupler, whereby the movement of said coupler to snatch-roll-engaging position insures release of said shift-frame from said rebound-preventing lock before said released coupler and the snatch-roll can co-operate to move the shift-frame to upper-case position.

Said features render it impossible to cause, as by improper manipulation of the case-shift key, partway or abortive engagement of the coupler with the snatch-roll, or to cause failure of release of the shift-frame from said rebound-preventing lock. Said features thus guard against liability of jamming the case-shift mechanism, and the snatch-roll may be arranged to effect the case-shift positively.

A further feature of the invention resides in provision whereby an electric motor, employed to drive the snatch-roll and normally at rest, is automatically caused to be started, depending upon actual release of said coupler; and whereby, further, said motor is automatically caused to be stopped as a result of the case-shift movement effected by means of said released coupler. Improper manipulation of the case-shift key may not cause useless starting and running of the motor, since it is provided that any depression of said key, except as it results in closing the driving connection, that is, releasing said coupler, and releasing the shift-frame from said rebound-preventing lock, cannot start the motor.

Two case-shift keys may be employed, one at the right and one at the left of the keyboard, and means operable by either key may serve to release the coupler and start the motor. The aforesaid detent-device that sustains the shift-frame in upper-case position is controlled by each case-shift key so that the shift-frame is released from said detent-device at the return of either shift-key.

A shift-lock-key device serves to hold the shift-frame, for continuous upper-case typing, without the typist keeping her hand on the shift-key. One of the case-shift keys when depressed effects release of the shift-frame from the upper-case position maintained by means of said shift-lock-key mechanism; and a further feature of the invention resides in provision whereby the depression of the case-shift key for effecting said release of the shift-frame, neither restarts the motor, nor has any effect on the coupling-device such as would cause the latter to re-engage the snatch-roll.

The coupling-device or coupler may be in the form of a link operatively connected at one end to the shift-frame and swingable to move its other end into and out of engagement or mesh with the snatch-roll.

Certain features of the invention pertain to the means for releasably latching the coupler in its normal initial position, wherein it is withdrawn from the snatch-roll, and for dependably controlling said coupler following its release from said initial position. A novel movable guide or controller, preferably in the form of a lever having a stationary fulcrum, has an operating connection to the coupler so that turning of said lever from a normal position causes the coupler to be moved into engagement with the snatch-roll. In the resulting power-driven case-shifting stroke of said coupler said connection permits the coupler to encounter a deflector for disengaging the coupler from the snatch-roll near or at the end of said stroke. Said controller or lever is connected to a cooperating element or controller normally latched for determining the normal positions of the coupler-controlling lever and coupling link. The case-shift key is connected to a releaser normally operative to release said controller for resulting movement of the latter, along with said lever and coupler, to engage the coupler with said snatch-roll. Said element may have a connection to the case-shiftable train other than by way of the aforesaid connection between the coupler and its aforesaid lever. By means of said other connection, the controller, and hence the coupler-lever are moved so as to amply disengage the coupler from the snatch-roll at the end of the case-shift stroke. A spring connection between the controller and the coupler-lever cooperates to effect said ample disconnection of the coupler from the snatch-roll. The connection between the coupler-lever and the coupler also cooperates to guide the latter clear of the snatch-roll during the return of the coupler from its power-driven stroke, to its normal initial position, the arrangement being preferably such that said return occurs with the return of the shift-frame to lower-case position.

A switch operative to start and stop the electric motor may be operatively connected to said controller so that the release of the latter operates said switch to start the motor and the return of the controller operates said switch to stop the motor.

The power case-shift mechanism may be associated with the Underwood carriage-return mechanism to the end that one electric motor and one motor-switch unit may serve for the carriage-return operation and for the power case-shift operation. The motor-switch unit is novel in that it includes two switch members individually operable relatively to a common contact member to start and stop the motor, one switch member being associated with the carriage-return mechanism and the other with the case-shift mechanism. The case-shifting snatch-roll may be driven from the shaft to which the carriage is connectible for return of the carriage.

Other features and advantages will hereinafter appear.

In the accompanying drawings,

Figure 1 is a side view showing the relative positions of the parts when the coupling-link encounters a deflector for withdrawal of said coupling-link from the snatch-roll.

Figure 2 is a cross-sectional side view of part of the case-shift mechanism, and the power drive for the snatch-roll, with the parts in normal positions.

Figure 3 is a perspective of the case-shift mechanism with the parts in normal positions.

Figure 4 is a side view showing the relative positions of the parts when the coupling link has just been released and become engaged with the snatch-roll by depression of the case-shift key.

Figure 5 is a fragmentary side view showing a snatch-roll-gripping head of the coupling-link rotated by the snatch-roll preparatory to the case-shifting stroke of the coupling-link.

Figure 6 is a cross-sectional side view showing the relative positions of the parts at the stage during the case-shift when the snatch-roll-driven coupling-link is about to engage the deflector for its disengagement from the snatch-roll.

Figure 7 is a side view showing the relative positions of the parts when the coupling-link has become fully disengaged from the snatch-roll at the end of the case-shifting stroke.

Figure 8 is a cross-sectional side view, supplemental to Figure 2, showing further case-shift-mechanism parts in normal positions.

Figure 9 is a top plan cross-section on the trace 9, Figure 2, showing details of the connections between the carriage-return shaft and the snatch-roll.

Figure 10 is a side view of the shift-lock-key mechanism and co-operating parts actuated to sustain the shift-frame for continuous upper-case typing.

Figure 11 is a side view of the shift-lock-key mechanism and shows the latter normally inoperative, at depression of the shift-key, to sustain the shift-frame in upper-case position.

Figures 12, 13, 14:
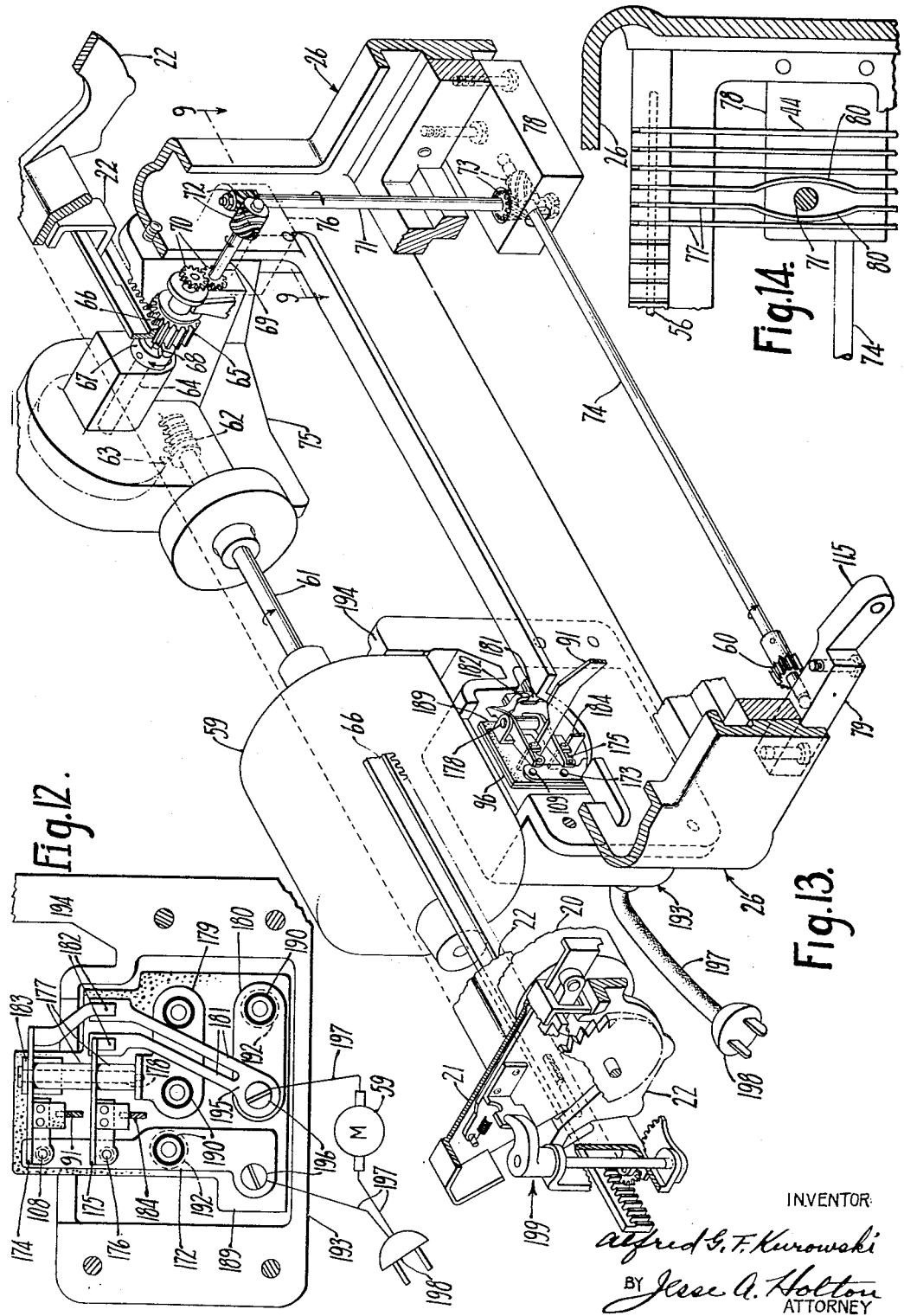
Figure 12 is a front view of the motor-switch unit and includes a circuit diagram.
Figure 13 is a perspective of the motor and its driving connections to the carriage-return mechanism and case-shifting snatch-roll, the view also including line-space mechanism and the motor-switch unit.
Figure 14 is a top plan sectional view including some of the type-key levers adapted for passage therebetween of a vertical shaft of the snatch-roll drive.

A revoluble platen 20 is journaled in a frame 21 movable vertically in a letter-spacing carriage 22 for case-shifting said platen relatively to upper and lower typewriter types 23, Figure 2. Said carriage runs on a rear rail 25 and a front rail (not shown) supported by typewriter main frame 26 partly shown in Figures 2, 8 and 13. The usual means for guiding the platen-frame 21 vertically include a rock-shaft 28 journaled in the carriage 22 and having arms 29 connected to the sides of the platen-frame 21 at 30.

A roll 31 on the platen-frame 21 operatively connects the latter to a shift-rail 32 forming part of a shift-lever or shift-frame 33 including shift-rail carrying side members 34, 35, and a thereto connected cross-shaft 36 at which said shift-frame is pivoted in the typewriter-frame 26 for swinging said shift-rail 32 up and down. A locking interponent or lever 37 is fulcrumed on a fixed stud 38 and has a rearwardly-extending arm 39 provided with a notch 40, to interlock with a stud 41 in the left side-member 34 of the shift-frame 33 to lock the latter upon its restoration to lower-case position, Figures 2 and 8. Shift-keys 42 are on a left-hand case-shift key-lever 43 and a right-hand case-shift key-lever 44. Operating connection of said case-shift levers 43, 44 to said locking lever 37 includes a transverse rock-shaft 46, journaled in the typewriter frame, and a cam-arm 47 thereon engageable by a pin 48 on the left-hand shift-key lever 43, said rock-shaft also having a cam-arm 49 engageable by a pin 50 on the right-hand shift-key lever 44 and also having an arm 51 engaging an arm 45 of said lock-lever. By manually depressing either shift-key lever 43 or 44, the rock-shaft 46 will be turned counterclockwise, and thereby the lock-lever 37 will be turned counterclockwise from the Figures 2 and 8 position to the shift-frame releasing position, Figure 4.

A spring 53 co-operates to return the lock-lever 37, and a spring 54 co-operates to return the rock-shaft 46 upon release of either manually depressed shift-key lever 43 or 44. Each shift-key lever 43, 44 has an individual restoring spring 55 and is fulcrumed at 56 in a cross-member 57 of the framework. Each shift-key lever 43, 44 is also laterally guided in a key-lever comb plate 58, Figure 8.

An electric motor 59, Figure 13, on the back of the typewriter-frame 26 is used for returning the carriage and is also used to drive a snatch-roll 60 to which, as will be explained presently, the shift-frame 33 becomes connected for a resulting shift to upper-case position upon manually depressing either case-shift key-lever 43 or 44. A transverse shaft 61 extends from said motor 59 and, through a worm 62 and gear 63, drives a counter-shaft 64 carrying a carriage-return pinion 65 meshing with a carriage-return rack 66 on the typewriter-carriage 22. The carriage-return mechanism is fully described in said Patent 1,679,727, it being noted here that said pinion 65 is slidable axially on said motor-driven counter-shaft 64 to clutch it thereto or unclutch it therefrom for starting and stopping a carriage-return run, said counter-shaft 64 having a clutch-collar 67, Figure 2, engageable by a clutch-tooth 68 of said pinion 65.

Said motor 59 drives the snatch-roll 60, for the case-shift, by means of the following train. A short shaft 69 (Figures 2, 9 and 13) is driven by the counter-shaft 64 through pinions 70, and, in turn, drives a vertical shaft 71 through helical pinions 72, and said vertical shaft, in turn, drives, through helical pinions 73, a transverse shaft 74 to which the snatch-roll 60, shown disposed near the left side and base of the machine, is fastened. The counter-shaft 64 and one end of the motor-shaft 61 are shown journaled in a fixture 75 to which is fixed a block 76 in which the short shaft 69, one end of the counter-shaft 64, and the upper end of the vertical shaft 71 are journaled, said fixture 75 being fixed, Figures 2 and 3, to the back of the typewriter frame 26. The vertical shaft 71 passes between shaft-clearing bends 80 of partly shown type-key levers 77, Figure 14, fulcrumed in the frame cross-member 57. The lower end of said vertical shaft 71 and the right end of the snatch-roll shaft 74 are journaled in a block 78 (Figures 2 and 13) attached to the framing. The left end of the snatch-roll shaft 74 is journaled in a block 79 attached to the framing.

Through the described train of connections, the motor 59 rotates the snatch-roll 60 in the direction of the arrow, Figures 2 and 13, the counter-shaft 64 of said train being free to turn without turning the carriage-return pinion 65 when the latter is in its normal unclutched position.

At depression of either shift-key lever 43 or 44 the shift-frame 33 (along with the platen-frame 21) is shifted to upper-case positions by means of the motor-operated snatch-roll 60. The shift-frame is sustained in upper-case position as long as the operated case shift-key lever remains depressed and returns to lower-case position independently of the snatch-roll upon release of the depressed case shift-key lever. The motor 59 is preferably normally at rest and is caused to start and stop in accordance with starting and completing the shift of the shift-frame 33 to upper case. The novel mechanism whereby these and other features of operation are accomplished will now be described.

A coupler in the form of a link 81 is pivoted at one end, as at 82, Figure 3, to the left side member 34 of the shift-frame so as to be swingable downwardly from a normally retracted position, Figures 2, 3 and 8, to mesh a toothed sector 83, pivoted to said link at 84, with the snatch-roll 60. A bracket 85 attached to said side member 34 co-operates with the latter to support the coupler pivot 82. A coupling-link controlling-lever 86 is fulcrumed on a stud 87 in the framework and has an arm 88 having a slot 89 engaging a pin 90 in the coupling-link 81. A bar 91 is operatively connected to and extends rearwardly from an upright arm 92 of said coupling-link controlling-lever 86 for normally engaging a latch-plate 93 slotted as at 94 to admit said bar 91. Said bar 91 co-operates to control the coupling-link 81, and is prolonged rearwardly to play in a slot 95 in a plate 96 mounted on the back of the typewriter-frame 26. Said slotted plate 96 serves as a fulcrum about which the coupling-link controlling bar 91 is swingable for unlatching or relatching it relatively to the latch-plate 93, and said slotted plate 96 also guides the coupling-link controlling bar 91 for endwise movements. A spring 97, attached to the latch-plate 93, pulls obliquely on the bar 91 for drawing the bar rearwardly upon its release from the latch-plate 93, and also for drawing said bar downwardly to re-engage its latching shoulder 98 with said latch-plate 93 upon forward return of said bar.

The connection of the bar 91 to the lever 86 is arranged to permit up-and-down movement of said bar relatively to the latch-plate 93 and also to permit, for a purpose which will be described later, relative endwise movement of said bar 91, and turning of said lever 86 about its fulcrum-stud 87. To this end said connection is effected by a stud 100 in the bar 91, and a slot 101 or other suitable formation in the arm 92 of said lever 86 so that said bar 91 has up-and-down play and end-play relatively to said lever 86.

With the parts in their normal positions, Figures 3 and 8, a spur 102 of the coupling-link control-bar 91 overlies a companion shoulder 103 on a bar lifter or releaser 104 pivoted at 105 to the lock-lever 37, and laterally retained at its upper end between prongs 99 on the latch-plate 93. Thus, at operation of either shift-key lever 43, 44, the accompanying anti-clockwise rotation of the lock-lever 37 to the Figure 4 position lifts the releaser 104 and thereby swings the bar 91 upwardly to the dotted-line position 91ª, Figure 4, to release said bar from the latch-plate 93. It results that the spring 97 immediately moves the released bar 91 rearwardly, from said dotted-line position to the full-line position, Figure 4, and thereby, through the lever 86, depresses the coupling-link 81 to mesh the toothed sector 83 of the latter with the snatch-roll 60. When the bar 91 has moved rearwardly the spur 102 thereof has passed from the releaser shoulder 103 and under the down-pull of the spring 97 said bar 91 has dropped slightly so that its lower edge 107 rests, Figure 4, on the latch-plate 93.

In its normal latched position, Figure 8, the coupling-control bar 91 keeps a spring-pressed movable contact 108 separated from a companion contact 109; said bar 91 having a shoulder 110 normally engaging an insulated tab 111 of said movable contact 108. Said contacts 108, 109 are mounted on the plate 96 as will be explained later, and serve as a motor starting and stopping switch. At the described release of said control-bar 91, by operation of either case-shift key-lever 43, 44, the resulting rearward movement of said bar 91, besides causing the coupling-link 81 to engage the snatch-roll 60, also permits the spring-pressed contact 108 to close upon the contact 109 to start the motor and thereby rotate said snatch-roll.

The rotating snatch-roll 60 initially turns the toothed coupling-link sector 83 about its pivot 84, the turning of said sector being limited by a shoulder 106 thereof striking the coupling-link 81, as in Figure 5, and thereupon said coupling-link 81 co-operates with the snatch-roll 60 to drive the shift-frame 33 (and platen-frame 21) to upper-case position. The initial turning of said toothed coupling-link sector 83 conduces to proper meshing thereof with the snatch-roll 60.

The rearward movement of the control-bar 91 also insures that the locking lever 37 is in shift-frame-releasing position, Figure 4, when the coupling-link 81 is engaged with the snatch-roll 60. For this purpose a cam-edge 113 on said bar 91 passes under a pin 114 of the releaser 104, which is connected to said locking lever 37, so that the latter cannot fail to be in shift-frame-releasing position when the coupling-link 81 is engaged with the snatch-roll. This provision for insuring timely withdrawal of the locking lever 37 avoids liability of jamming the mechanism, should the bar 91 and the thereby controlled coupling-link 81 be released independently of the shift-key levers 43, 44. Thus, for example, should the shift-key lever 43 or 44 be depressed and immediately released, the coupling-link control-bar 91, urged by its spring 97, will nevertheless escape, causing the coupling-link 81 to engage the snatch-roll, and also causing the motor 59 to be started; but the immediate release of the shift-key lever following its depression cannot cause immediate, that is, untimely, drop back of the locking lever 37 since said escaping bar 91 operates, through the releaser 104 and its pin 114, to withdraw said locking lever 37 to shift-frame-releasing position concomitantly with its operation to engage the coupling-link 81 with the snatch-roll 60.

Having initialy turned the coupling-link sector 83 to the Figure 5 position, the rotating snatch-roll 60 then draws the coupling-link 81 forwardly and thereby moves the shift-frame 33, and platen-frame 21, toward upper-case position. At an appropriate point in the snatch-roll driven movement of the shift-frame 33 a cam-edge 116 of the coupling-link 81 encounters a deflector 117, wherby further movement of the coupling-link 81 toward completing the movement of the shift-frame 33 to upper case results in the coupling-link 81 being cammed clear of and thereby disengaged from the snatch-roll 60. Figure 6 shows the coupling-link cam-edge 116 about to be engaged by said deflector 117 at a suitable point before the shift is completed as is indicated by the position (shown in full line) of the platen 20 between its upper and lower case positions (shown by the dotted lines). Figure 1 shows how said deflector 117 has cammed the coupling-link 81 clear of the snatch-roll 60 by the time the shift-frame has reached the limit of its movement for shift to upper case. As is indicated by the clearance 118, Figure 1, the toothed coupling-link sector 83 may escape from the snatch-roll slightly before the shift-frame 33 reaches said limit of movement, so that the concluding part of the movement of the shift-frame 33 is effected by momentum.

The deflector 117 may be the head of the fulcrum-stud 87 for the coupling-link control-lever 86, and said head may be eccentric to said stud whereby, by turning the latter in its mounting 115 in the typewriter framing, adjustment of the deflector relative to the coupling-link 81 may be effected. The stud 87 is secured in such adjusted position by a clamp nut 119, Figure 8, receivable by a thread 120 of said stud, Figure 3.

An adjustable stop 121, on each side of the carriage 22, is engaged by a stop 122 on the platen-frame 21, Figure 11, to limit the upward throw of said frame 21 and the shift-frame 33. For detaining the platen 20 in its upper-case position when the power-shift has been effected, the shift-frame 33 carries a latch-arm 123, the same extending forwardly from a pivot 124 on the shift-frame side member 35 so that when the shift-frame 33 reaches the limit of its throw a hook 125 of said latch-arm is in position for engagement with a catch 127, the latch-arm being pressed by a spring 128 to turn about its pivot 124 for effecting said engagement. The catch 127 is adjustable forwardly or back for gaging the upper-case position of the platen, and, for this purpose, securing screws 129 pass through elongated holes 130 in the catch and secure the catch to a cross-bar 131 of the frame-work. The platen-frame-arresting stops 121 on the carriage may be adjusted relatively to the adjustment of the catch 127. A leading edge 132 of the latch-arm 123 may rest on top of the catch 127 when the shift-frame 33 is in lower-case position, Figure 2.

A pusher 134, on the shift-frame 33, engages the rear edge of the spur 102 of the coupling-link control-bar 91, so that said bar is pushed forwardly during the shift of said frame 33 to upper-case position. Thus, when said shift-frame 33 reaches the partly-shifted position, Figure 6, and the coupling-link 81 is about to be cammed clear of the snatch-roll 60, the shoulder 110 of said forwardly-moving bar engages the movable contact 108 to separate it from the contact 109 to break the motor-circuit. By the time the motor-circuit is thus broken, as exemplified in Figure 6, the motor 59 and the case-shifting train have acquired enough momentum to complete their case-shift throw.

During the forward movement of said bar 91 the latter may move endwise relatively to the thereto connected lever 86, the lever-engaging bar stud 100 being smaller in diameter than the width of the lever-slot 101 in which said stud plays. This relative endwise movement of the bar 91 stretches a spring 137 before further movement of said bar rotates said lever 86 counterclockwise, the spring being stretched by reason of the counterclockwise movement of said lever being resisted by the hold of the snatch-roll 60 on the coupling-link toothed sector 83 tending to keep the latter in engagement with said snatch-roll 60. It will be obvious that said spring 137 may be light so that it will yield to said hold of the snatch-roll 60 on the coupling link 81, 83. The slot 89 whereby said lever 86 is articulated with the coupling-link 81 is curved or shaped to permit the counterclockwise rotation of said lever 86 without disturbing the coaction of the coupling-link with the snatch-roll 60. At the point where the couping-link 81 has just been cammed clear of the snatch-roll 60 by the deflector 117, as in Figure 1, the spring 137 is under tension and it results that, as said point is reached, said spring becomes effective to snap the coupling-link 81 from the Figure 1 position to the Figure 7 position, it being apparent from Figure 7 as compared with Figure 1 that said lever 86 has turned forwardly relatively to the bar 91. This provides for ample withdrawal of the coupling-link from the snatch-roll after the latter has served to effect the shift to upper case.

During the shift to upper case the operated shift-key lever 43 or 44 remains depressed and also remains depressed during the typing of the upper-case character or characters. During the sustained depression of the operated shift-key lever 43 or 44, the locking lever 37 remains in shift-frame releasing position and, therefore, the releaser 104 remains in elevated position. Therefore, the releaser shoulder 103 is in front of the spur 102 of the bar 91 when the latter has become restored to its forward position as in Figure 7, because at the forward movement of said bar 91 said releaser 104 swings forwardly about its pivot 105 on the locking lever 37. A stud 139 on the releaser 104 bears on a face 140 provided on the shift-frame side-member 34, wherefore said face 140 may co-operate with the spur 102 of said bar 91 to swing the releaser forwardly about its pivot during the shift to upper case. At release of the operated shift-key lever 43 or 44, the locking lever 37 returns to normal position and thereby lowers the releaser 104, whereupon a spring 141 attached to the stud 139 of said releaser turns the latter rearwardly about its pivot 105 to follow the return of the shift-frame 33 to lower-case position. Thus, the shoulder 103 of said releaser returns to its normal position under the spur 102 of the forwardly restored coupling-link control-bar 91, and the releaser stud 139, bearing on the shift-frame face 140, stops the rearward swing of the releaser at the normal position of the latter. The return of the shift-frame 33 to lower-case position results from release of the operated shift-key lever causing the latch-arm 123 to be released from the catch 127. To this end the arm 49 of the shift-key-operated rock-shaft 46 is connected by a link 143, Figure 3, to a bell-crank 144 pivoted at 145 to an upturned ear 146 of the catch 127, said bell-crank having a horizontal arm 147 underlying a laterally projecting pin or roll 148 of the shift-frame latch-arm 123. At release of the manually depressed shift-key lever 43 or 44 said rock-shaft 46 is also released and concomitantly the restoring spring 54 turns said rock-shaft 46 clockwise from the Figure 10 position to the Figure 2 position, and thereby, through its arm 49 and the described link 143 and bell-crank 144, raises the latch-arm 123 clear of the catch 127 whereupon the shift-frame 33 and the platen-frame 21 return to normal lower-case positions either by gravity or by a suitable spring. It will be understood that depression of either shift-key lever, 43 or 44, operates through said rock-shaft 46 and link 143 to rock the bell-crank 144 clockwise from the Figure 2 position for permitting the shift-frame latch-arm 123 to drop into latching engagement with the catch 127. The link 143 may be adjustably joined as at 150, Figure 2, for adjusting its length to regulate the latch-arm 123.

In the Underwood machine the return of the shift-frame 33 to lower-case position is usually effected by gravity. To lighten the work of the snatch-roll 60 in moving the shift-frame 33 to upper case, the weight of the latter and the platen-frame 21 may be counterbalanced in part by a spring 149, Figure 3.

For continuously typing in upper case, the shift-frame latch-arm 123 may be kept in upper-case engagement with the catch 127 by locking the shift-key lever in depressed position. A shift-key-lever hold-down lock of the kind shown in Patent No. 1,223,279 to W. F. Helmond, dated April 17, 1917, is used and includes a shift-lock key 152 on a lever 153 pivoted at 154 to the right-hand shift-key lever 44. Depression of said shift-lock key 152 rocks said lever 153 counterclockwise on the shift-key lever 44 and, at the same time, the latter is depressed and the latch-arm-releasing bell-crank 144 is rocked to retracted position relatively to said shift-frame latch-arm 123. With said lever 153 thus rocked a depending tongue 156 thereof clears a laterally projecting pin 157 of the cam-arm 49 of the rock-shaft 46 to permit said cam-arm, urged by the restoring spring 54 and having a latching shoulder 158, to latch over the pin 50 of the depressed shift-key lever 44, thereby locking the latter down mechanically to keep the latch-arm relasing bell-crank 144 in retracted position as in Figure 10. It will be understood that the depression of the right-hand shift-key lever 44 has operated by way of the rock-shaft 46 to withdraw the locking lever 37 from the shift-frame 33 and to trip the control-bar 91, causing the shift-frame-coupling link 81 to engage the snatch-roll 60, and the motor 59 to be started by closing the motor switch contacts 108, 109. It will also be understood that the control-bar 91 becomes restored, and thereby the coupling-link 81 becomes disconnected from the snatch-roll and the motor switch contacts 108, 109 are opened during the resulting shift to upper case, irrespective of whether the shift-key lever is held down manually as in Figure 11, or is locked down mechanically as in Figure 10. The rock-shaft 46 moves only slightly toward its fully restored position when its cam-arm 49 latches over the depressed shift-key lever 44, and hence said rock-shaft keeps the locking lever releaser 104 elevated enough to keep the shoulder 103 of the latter in front of the spur 102 on the control-bar 91 during continuous upper-case typing.

The shift-lock lever 153 is not rocked relatively to the shift-key lever 44 when the latter is depressed and held down manually as in Figure 11, and, thus, the depending tongue 156 of said lever 153 becomes interposed behind the pin 157 of the cam-arm 49 to prevent the latter from locking said shift-key lever 44 down. Stops 159 on the shift-lock lever 153 limit its rotation by engaging the pin 50 of the shift-key lever 44, as in Figures 10 and 11. A spring 160 restores the shift-lock lever 153 to its normal position relatively to the shift-key lever 44 when the latter is released from interlock with the arm 49. This release of the shift-key lever 44 is effected by depressing the left-hand shift-key lever 43, thereby rocking the shaft 46, by means of its left cam-arm 47, to withdraw the right cam-arm 49 from the pin 50, whereupon the right-hand shift-key lever 44 is restored upwardly by its spring 55.

When the left-hand shift-key lever 43 is thus operated for releasing the right-hand shift-key lever 44 for ensuing restoraton of the platen to lower case, it does not operate to release the control bar 91 from its latch-plate 93, because at that time the bar-lifting shoulder 103 of the releaser 104 is, as above noted, in front of the bar-spur 102 as in Figure 10. Thus, at operation of the left-hand shift-key lever 43, for effecting release of the right-hand shift-key lever 44, tripping of the control-bar 91 from said latch-plate 93 is avoided, and hence idle reconnection of the shift-frame 33 to the snatch-roll 60 and idle starting of the motor are avoided. At said release of the right-hand shift-key lever 44, the rock-shaft 46, urged by the spring 54, fully returns to normal position, causing the bell-crank 144 to lift and release the shift-frame latch-arm 123 from the catch 127. Thereupon the shift-frame 33, along with the platen-frame 21, returns, by gravity, to lower-case position consonantly with discontinuing the typing in upper case.

The curved slot 89, of the control lever 86, and the coupling-link pin 90 co-operate to guide the coupling-link 81 to keep the toothed sector 83 of the latter clear of the snatch-roll 60 during the rearward return of said link 81 that accompanies return of the shift-frame 33 to lower-case position. During said rearward return of the coupling-link 81, a tail 162 of the toothed sector 83 may engage and pass under a fixed abutment 163, thereby turning said sector 83 back to its normal position on the coupling-link 81. Screws 164 secure said abutment 163, together with a bracket 165 for the latch-plate 93, to the framing-cross-bar 131. Said abutment 163 also engages a top edge 166 of the coupling-link 81 to limit the upward swing of said coupling-link by the control-lever spring 137 when the latter acts, through the control lever 86, to amply withdraw said coupling-link 81 from the snatch-roll 60, as in Figure 7. In the normal positions of the parts, Figures 2 and 8, said spring 137 also acts to keep the coupling-link definitely against said abutment 163, to fix the normal positions of said link 81 and the control lever 86, and to prevent rattle of the parts; and, therefore, when the control-bar 91 is latched by the latch-plate 93, said spring 137 is slightly stretched as is indicated by space 167, Figure 8, between the control-bar stud 100 and the back edge of the control-lever slot 101. The latch-plate 93 is adjustable forwardly or rearwardly, in that it is adjustably secured as at 169, Figure 3, to the bracket 165. By appropriately adjusting said latch-plate 93, sufficient stretch of the spring 137 may be determined to keep the coupling-link 81 against said abutment 163, and the adjustment may also serve to adjust the control-bar 91 endwise relatively to the shoulder 103 of the control-bar releaser 104.

The normal position of the releaser-shoulder 103 relatively to the control-bar spur 102 may also be adjusted by adjusting a piece 170 forming the releaser-positioning face 140 on the shift-frame 33, said piece 170 being adjustably secured to said shift-frame 33 as at 171, Figure 3. The extent of forward restoration of the control-bar 91 may be regulated by adjusting the control-bar pusher 134, the latter being adjustably secured to the shift-frame 33 as at 168, Figure 3.

Referring to the motor-switch structure, Figures 8, 12 and 13, the plate 96 which guides the control-bar 91 also mounts a terminal bar 172 carrying the fixed contact 109 and also carrying a fixed contact 173. The movable contact 108 is on a pivoted switch arm 174; and a similar switch arm 175 movably mounts a contact 176 that, with the fixed contact 173, forms a motor switch associated with the carriage-return mechanism. Said switch arms have hubs 177 and may turn individually on a common fulcrum-rod 178 presented by a bracket 179 and supported at the top by a bracket 183, said brackets being mounted on said plate 96. Said plate 96 also mounts a terminal bar 180 from which extend metal leaf-springs 181 to engage tabs 182 of the switch arms 174, 175, as in Figure 12, thus constantly connecting said arms electrically to said terminal bar 180, and also constantly tending to move said switch arms into engagement with their respective contacts 109, 173.

The switch-arm 175 is controlled by a link 184, guided in the plate 96 for endwise movement. Said link 184 is operatively connected to the carriage-return mechanism substantially as set forth in said Patent 1,679,727. When the carriage-return mechanism is brought into play said link 184 is caused to move rearwardly whereby its shoulder 185 recedes from an insulated tab 186 of the switch-arm 175, thereby causing the latter, urged by the leaf-spring 181, to close up on the fixed contact 173 for starting the motor 59. At the end of the carriage-return run, said link is restored forwardly to open the contacts 173, 176 to stop the motor. The terminal bars 172, 180 and the brackets 179, 183 are appropriately insulated electrically as by an insulating plate 189 between these parts and the plate 96, and by insulating bushings 190. The mounting-plate 96 for the described switch parts may be supported on studs 192 in a housing 193, at the back of the typewriter frame, and shown combined with a motor support 194. The switch-arm springs 181 extend from a base-portion 195 to form with the latter a unitary piece, Figure 12, attached to the terminal bar 180 as by one of two terminal-screws 196. The other terminal-screw is in the terminal bar 172. Figure 12 indicates leads 197 appropriately connecting a current-supply plug 198, the motor 59 and the switch-structure terminal-screws 196.

The usual Underwood platen-line-spacing mechanism and its connections for automatic operation with the carriage-return mechanism are indicated at 199, Figure 13, and are fully described in Patent 1,835,776 to W. F. Helmond, dated December 8, 1931.

The operation of the power case-shift mechanism will be understood from the foregoing detailed description and may be summarized as follows:

Manually depressing either the right or left case-shift key-lever, 43 or 44, rocks the shaft 46 to rock the lock-lever 37 to position to unlock the shift-frame 33 as in Figure 4. Said shaft 46 also rocks the bell-crank 144 clear of the shift-frame latch-arm 123 for permitting the latter to later engage the catch 127.

The releaser 104 operates, through said rocking of said lock-lever 37, to lift the control bar to the dotted-outline position, Figure 4, to release its latching-shoulder 98 from the latching-plate 93. Ensuingly, said control-bar 91 is immediately moved rearwardly by its spring 97 and thereby operates, through the control-lever 86, to move the coupling-link into engagement with the snatch-roll 60 as in Figure 4, and to concomitantly cause the switch-contacts 108, 109 to close, thereby starting the motor 59 to rotate said snatch-roll 60.

The resulting power-driven movement of the shift-frame 33 and platen-frame 21, to upper-case position, moves the control-bar 91 forwardly again by means of the shift-frame-carried pusher 134. This forward restoration of said control-bar 91 also rocks the control-lever 86 forwardly again, but without disturbing the coupling-link 81 while the latter is being power-driven by the snatch-roll 60, since the control-lever slot 89 is shaped so that the power-driven stroke of said coupling-link and the restoring or forward movement of said control-lever 86 do not interfere with one another. Thus, said control-lever continues during its forward movement to co-operate to keep the coupling-link 81 in proper engagement with the snatch-roll 60 while the latter is driving said coupling-link; and the control-lever slot 89 is arranged so that said forward movement of the coupling-link does not interfere with the withdrawal of the coupling-link from the snatch-roll.

Figure 6 shows the coupling-link 81 about to be cammed from the snatch-roll by encountering the deflector 117 before the shift to upper case has been completed. At this instant in the case-shift stroke the contacts 108, 109 are also opened by the control-bar 91 for stopping the motor, it being understood that the parts may operate by momentum for completing the case-shift.

The control-bar 91, when moved rearwardly to effect engagement of the coupling-link 81 with the snatch-roll 60, co-operates to force the lock-lever 37 to shift-frame-releasing position, and to keep it there, during the control-bar restoration accompanying the case-shift of the shift-frame 33, until the shift-frame stud 41 has moved forwardly far enough to clear the lock-lever notch 40 as in Figure 6. For this purpose the cam-edge 113 of said control-bar 91 engages the pin 114 of the control-bar releaser 104, the latter being connected to said lock-lever 37. Thus, the lock-lever 37 can not drop back to interlock with the shift-frame 33 while the coupling-link 81 is engaged with the snatch-roll 60 to drive the shift-frame 33 to upper-case position, and liability of jamming the mechanism, as through improper manipulation of the shift-keys, is avoided.

Figures 1 and 11 represent the shift-frame 33 and platen-frame 21, at the limit of their power-impelled throw to upper-case position, and said limit may be determined by means of the stops 121, 122 at the side of the platen-frame. As said limit of throw is reached the shift-frame latch-arm 123 drops to engage the catch 127, as at Figure 11, to keep the shift-frame 33 and platen-frame 21 in upper-case position when the coupling-link 81 becomes disengaged from the snatch-roll 60.

During the forward restoration of the control-bar 91 and the control-bar lever 86, said lever 86 lags slightly relatively to said bar 91 by reason of the play at the connection, 100, 101, between these elements. The spring 137, at said connection, becomes effective to take up said lag at the instant when (Figure 1) the coupling-link 81, cammed by the deflector 117, escapes from the snatch-roll 60. That is to say, said control-lever 86 finally is moved forwardly with a snap by said spring 137 relatively to said control-bar 91 to thereby amply and quickly withdraw the coupling-link 81 from the snatch-roll 60 as in Figure 7.

The shift-frame 33 and platen-frame 21 remain in their upper-case position as long as the shift-key lever, 43 or 44, remains depressed. For temporary case-shifts the operator keeps the shift-key lever depressed manually. Upon its release the depressed shift-key lever is restored by its spring 55, thereby causing the rock-shaft 46 to be restored by its spring 54, the restoration of said rock-shaft 46 also restoring the bell-crank 144 so that its horizontal arm 147 lifts the shift-frame latch-arm 123 from the catch 127 causing the shift-frame 33 and platen-frame 21 to return by gravity to lower-case position. The restoration of said rock-shaft 46 is accompanied by restoration of the lock-lever 37 to the control of its spring 53 so that its rear arm 39 may drop to interlock again with the shift-frame in the lower-case position. The final dropping of said lock-lever arm 39 into interlock with the shift-frame 33 as the latter finally becomes returned to normal position, also finally drops the thereto connected releaser 104, whereupon the latter, urged by its spring 141, swings rearwardly to restore its shoulder 103 to normal position under the control-bar spur 102. The shift-frame face 140 co-operates to control the rearward swing of the releaser 104 so that its shoulder 103 cannot move prematurely under the control-bar spur 102.

For continuous upper-case typing, the right-hand shift-key lever 44 is depressed and the shift-lock lever 153 thereon is rocked to the Figure 10 position by means of its key 152 to clear the pin 157 of the cam-arm 49 to permit the latter to latch over and hold down said shift-key lever 44 and thereby keep the bell-crank 144 retracted from the shift-frame latch-arm 123, as in Figure 10, it being apparent that the shift-frame 33 will then remain in upper-case position when the operator's hand is withdrawn from the right-hand shift-key. For restoring the shift-frame 33, the locked-down shift-key lever 44 is released by depressing the left-hand shift-key lever 43. This rocks the shaft 46 counterclockwise from the Figure 10 position to withdraw the cam-arm latching shoulder 158 from the shift-key lever pin 50, whereupon said right-hand shift-key lever is restored by its spring 55, causing the rock-shaft 46 also to be restored since the left-hand shift-key lever 43 is only depressed momentarily. This restoration of said rock-shaft 46 rocks the bell-crank 144 back to normal position, thereby tripping the shift-frame latch-arm 123 for resultant return of the shift-frame 33 and platen-frame 21 to lower-case position.

When the shift-frame 33 is maintained in upper-case position by locking down the right-hand shift-key lever 44 the control-bar releaser 104 is in elevated position so that the releaser shoulder 103 is in front of the control-bar spur 102, as in Figure 10. It will be apparent, therefore, that the momentary operation of the left-hand shift-key lever 43 for releasing of the right-hand shift-key lever 44 does not operate to release said control-bar 91, and that, therefore, idle re-engagement of the coupling-link 81 with the snatch-roll, and idle restarting of the motor are avoided. At the return of the right-hand shift-key lever 44 resulting from momentary depression of the left-hand shift-key lever 43 the releaser 104 is lowered, along with the rear arm 39 of the lock-lever 37 and is finally swung rearwardly by its spring 141 when said lock-lever arm finally settles into interlock with the fully restored shift-frame 33.

It will be seen now that the described power-case-shift mechanism is arranged to operate when unfailing dependability, that it is simple in arrangement and therefore inexpensive, and that it is easily applicable to existing forms of machines, such as the standard Underwood. The disposition of the shift-key levers 43, 44, the rock-shaft 46, the lock-lever 37 and the shift-frame 33 is substantially similar to the disposition of these parts as found in the Underwood. Regarding the side members 34, 35 of the shift-frame 33, the same are simple modifications of similar Underwood shift-frame members, in order to receive the coupling-link 81, the latch-arm 123, the pusher 134, and the control-bar-releaser-controlling face 140.

Variations may be resorted to within the scope of the invention, and portions of the improvements may be used without others.

Having thus described my invention, I claim:

1. In a typewriter case-shift mechanism, the combination with a power-operated driver and a case-shiftable part, of a coupler connected to said part and movable for connecting and disconnecting it to and from said driver, a control device having operative connection with said coupler and normally latched to keep said coupler disengaged from said driver, a key operable to unlatch said control device, a spring acting to move said unlatched control device and coupler to engage the latter with said driver to effect a case-shift of said case-shiftable part, means co-acting with said part, during said case-shift, to restore said control device to latched condition, said operative connection between said coupler and control device being arranged so that the coupler stays in engagement with the driver while said control device is being restored by said case-shift, mans acting on the coupler independently of said control device to disengage said coupler from said driver as said part becomes case-shifted, and means to releasably retain said part in case-shifted position.

2. In a typewriting machine having a power-driven rotary snatch-roll and a part to be driven in one direction to a predetermined limit of stroke by said snatch-roll and subsequently returned in the opposite direction independently of said snatch-roll, the combination of a coupler operatively connected to said part, a control device having a pin-and-slot connection to said coupler and normally latched to keep said coupler disengaged from said snatch-roll, a key operable to unlatch said control device, a spring acting to move the unlatched control device and the coupler to engage the coupler with said snatch-roll for resultant stroke of said part in said first direction, means co-operating with said part at said stroke to restore the control device to latched condition, said pin-and-slot connection between said control device and coupler being arranged to keep said coupler in engagement with said snatch-roll while said control device is being restored, and means acting on said coupler independently of said control device to disengage the coupler from the snatch-roll relatively to said predetermined limit of stroke, said pin-and-slot connection being adapted to cooperate to guide the coupler clear of the snatch-roll, during the return stroke of said coupler along with said part in said opposite direction.

3. In a typewriter case-shift mechanism, the combination with a case-shiftable frame and a power-driven snatch-roll, of a coupler pivoted to said frame, a control device having a pin-and-slot connection with said coupler and normally latched in position to keep said coupler disengaged from said snatch-roll, a key operable to unlatch said control device, a spring acting to move the unlatched control device and coupler to engage said coupler with the snatch-roll to effect a case-shift of said frame, said control device being operatively connected to said frame so that said case-shift restores said controller to latched condition, said pin-and-slot connection between said control device and coupler being arranged so that while said control device is being restored by said case-shift, said coupler stays in engagement with the snatch-roll, a deflector encountered by said coupler to disconnect it from the snatch-roll, toward the end of the case-shift, independently of said control device, and means to releasably retain said frame in case-shifted position.

4. In a typewriting machine, the combination with an electric motor, a rotary snatch-roll driveable thereby, and a part movable in case-shift and return strokes, of a coupler connected to said part, a control device having operative connection with said coupler and normally latched to keep said coupler disengaged from said snatch-roll, a motor starting and stopping switch controlled by said controller, a case-shift key operable to unlatch said controller, a spring acting to move the unlatched controller and the coupler to engage the coupler with the snatch-roll and operate said switch to start said motor for a resultant case-shift stroke of said part, means co-operating with said part during its case-shift stroke to restore said controller to latched condition, thereby to operate said switch for stopping said motor, said operating connection between said controller and coupler being arranged so that said coupler stays in engagement with said snatch-roll while said controller is being restored, means acting on said coupler, independently of said controller, to disengage the coupler from the snatch-roll relatively to the end of the case-shift stroke of said part, and means to releasably retain said part in case-shifted position, the return stroke of said part being effected, independently of said snatch-roll, upon release of said part from said retaining means.

5. In a typewriting machine, the combination with a case-shiftable part and a power-driven rotary snatch-roll, of a coupler connected to said case-shiftable part, a controller connected to said coupler, an element having connection to said controller, a latch keeping said element, controller and coupler in normal positions wherein said coupler is disengaged from said driver, said element, controller and coupler being releasable from said latch for movement to engage said coupler with said driver for a resultant case-shift of said part, said element arranged to be engaged by said part, during the case-shift, to restore said controller, the connection between said controller and coupler being arranged so that the controller is restored independently of said coupler, and a spring connecting said element and said controller so that, as the latter is restored, said spring is tensioned and finally acts through said controller to withdraw said coupler from said snatch-roll at the end of the case-shift, said connection between said element and controller being arranged so that spring-tensioning movement of said element relatively to said controller occurs during the restoration of the latter.

6. In a typewriting machine, the combination with a case-shiftable part and a power-driven rotary snatch-roll, of a coupler connected to said case-shiftable part, and an element having connection with said coupler and normally latched to normally keep said coupler disengaged from said driver, said element being releasable to move with said coupler for engaging said coupler with said driver for resulting case-shift of said part, said element being arranged to be engaged by said part and restored to latched condition during the case-shift, the connection between said element and coupler being arranged so that said element is restored independently of said coupler, said connection including a spring arranged to become stretched during said restoration of said element, whereby said spring finally acts to withdraw said coupler from said snatch-roll at the end of the case-shift.

7. In a typewriting machine having types, a platen, and a main frame, the combination with a part movable for effecting a relative case-shift of said platen and types, and a power-operated driver, of two case-shift keys, one at each side of said frame, a rock-shaft supported by said frame and rockable by either shift-key, a withdrawable interponent normally interposed for locking said case-shiftable part in primary case position, said interponent being operatively connected to said rock-shaft, whereby its withdrawal is effected by operating either shift-key, a coupler connected to said case-shiftable part, a spring-urged coupler controller normally latched for keeping said coupler disconnected from said driver, and an operating connection from said locking interponent to said controller, whereby said withdrawal of said interponent by operating either shift-key releases said controller for consequent movement thereof to connect said coupler to said driver.

8. In a typewriting machine having a platen and types, the combination with a part movable to effect relative case-shifts of said platen and types, of a power-operated driver, a coupler connected to said case-shiftable part, a lever having a stationary fulcrum and operatively connected with said coupler, a control element articulated to said lever and normally latched to co-operate with said lever to keep said coupler normally disengaged from said driver, a case-shift key, an interponent normally locking said case-shiftable part in primary case position and operatively connected to said key so that depression of the latter withdraws said interponent from said case-shiftable part, a releaser operable by said interponent and operatively connected to said control element so that said withdrawal of said interponent by said shift-key concomitantly unlatches said control-element, and a spring acting to move said unlatched control-element, together with said lever and coupler, to engage said coupler with said driver for a resultant case-shift of said part.

9. The invention as set forth in claim 8, the operative connection between said control-element and releaser being arranged so that said control-element, at its movement by said spring, moves out of control of said releaser, said control-element being operatively connected to said case-shiftable part so that the case-shift movement of the latter restores said control-element to latched condition, said operative connection between said control-element and releaser being further arranged so that said control-element, at its restoration by said case-shifting part, displaces said releaser and thereby remains out of control of said releaser pending return of said releaser to normal position.

10. The invention as set forth in claim 8, inclusive of means operative while the case-shift key is depressed to sustain said part in case-shifted position, the arrangement further being such that the case-shift movement of said part restores said controller to latched condition independently of said releaser and without affecting the case-shifting movement of said coupler by said driver.

11. In a power-operable typewriter case-shift mechanism, the combination with a case-shiftable part, of an electric motor, a normally latched spring-pressed controller, a normally open motor switch operatively connected to said controller, a normally open driving connection between said motor and case-shiftable part, operatively connected to said controller, a case-shift key operatively connected to said controller so that depression of said key releases said controller, the resultant movement of said controller causing said driving connection and switch to close to case-shift said part, said controller being operatively connected to said case-shiftable part, whereby the latter at said case-shift restores said controller to latched condition to open said switch, means acting independently of said controller to open said driving connection for the conclusion of the case-shift, the operative connection between said controller and case-shift key being arranged so that the restoration of said controller by said case-shifted part is effected independently of said key, whereby the latter may remain depressed, and a detent-device automatically effective, while said key is depressed, to maintain said part in case-shifted position, said detent-device responding to release of said key to release said case-shifted part for self-restoration to normal case position.

12. In a power-operable case-shift mechanism for a typewriter, the combination of a case-shiftable frame, an electric motor, a mechanical driver driven by said motor and normally disconnected from said frame, a motor switch, spring-pressed means tending to operatively connect said driver and frame, to operate said switch, a latch normally restraining said spring-pressed means, a case-shift key having connections, effective upon depression of said key, to release said spring-pressed means from said latch to operate said switch to start said motor and to connect said driver and frame to effect a case-shift of the latter, a detent-device normally restrained by means of said key and released in response to depression of said key to become effective to hold said frame in said case-shift and to release said frame for resultant self-restoration of the latter in response to return of said key, said spring-pressed means being arranged so as to become restored to said latch at said case-shift of said frame and thereby effect, independently of said key, opening of said switch to stop said motor, and means acting to disconnect said driver and frame, independently of said key, in response to said case-shift.

13. In a typewriter having a case-shiftable frame, the combination with a power-driven rotary snatch-roll, of a coupler connected to said frame, a controller in the form of a lever having a pin-and-slot connection with said coupler, means releasably latching said lever in normal position, wherein said coupler is disengaged from said snatch-roll, a spring acting upon said lever and coupler, when released from said latching means, to move said coupler into engagement with said snatch-roll, said coupler being operatively connected to said case-shiftable part, whereby the case-shift of the latter restores said lever to the control of said latching means, said pin-and-slot connection between said lever and coupler being arranged so that said lever is restored substantially independently of said coupler while the latter is being driven by said snatch-roll, and means to effect disengagement of said coupler from said snatch-roll independently of the restoring movement of said lever.

14. In a typewriter, the combination with a case-shiftable frame, an interponent normally locking said frame in normal case position, a case-shift key connected for withdrawing said interponent, a power operable driver, a coupler for connecting said driver and case-shiftable frame, a controller operatively connected to said coupler and normally latched to keep said coupler disengaged from said driver, a releaser pivotally connected to said interponent and operatively connected to said controller whereby the withdrawal of said interponent by said shift-key releases said controller, and a spring acting to move said released controller and coupler for engaging said coupler with said driver, said releaser being connected so that the shift of said frame by said driver shifts said releaser, about its pivotal connection to said interponent, to disable its operative connection with said controller.

15. The invention as set forth in claim 14, said controller having operative connection with said case-shiftable frame so as to be restored to latched condition by the driver-actuated shift of said frame.

16. In a typewriter having a platen and types, the combination with a part shiftable to effect relative case-shifts of said platen and types, a power-operated driver, a coupler connected to said case-shiftable part, a controller connected to said coupler and normally latched to keep said coupler disengaged from said driver, two case-shift keys, a connection operable by either case-shift key to unlatch said controller, a spring connected to move the unlatched controller, and coupler, to engage said coupler with said driver, for resultant case-shift of said part from normal-case position, said controller being operatively connected to said part, so as to be restored to latched condition by said case-shift, and a shift-lock-key device settable at will, in conjunction with operating one of said case-shift keys, to maintain said part in the case-shifted position, said shift-lock-key device being arranged so that said case-shifted part is released for restoration by operation of the other case-shift key, said connection between the case-shift keys and controller being arranged so as to be disabled when said part is in case-shifted position, whereby said releasing operation of said other case-shift key is ineffective to unlatch said controller.

17. In a typewriter case shift mechanism, the combination with a case-shiftable frame, a power-operated driver, a coupler connected to said frame, two case shift keys, means normally cooperative with either key, at a depression thereof, to engage said coupler with said driver for resultant case shift of said frame, a device acting to disengage said coupler from said driver as said frame becomes case shifted, a holder dependent on sustained depression of said key to keep said frame in case shifted position, said means being adapted to become disabled by said case shift depending on sustained depression of said key, and to become restored upon return of said key, a shift-lock device settable at will in conjunction with depression of one of said keys to keep said frame in case shifted position, and to keep said means in disabled condition so that a following actuation of the other key is ineffective to engage said coupler with said driver, and means acting at such following actuation of said other key to restore said set shift-lock device with resultant release of said frame and restoration of said disabled coupler and driver engaging means.

18. In a typewriter case shift mechanism, the combination with a part case shiftable from and back to a normal position, of a retractable interponent normally interposed to lock said part in normal position, a power operated driver, a case shift key depressible to retract said interponent from said part, normally latched spring-urged means operatively connected to said interponent, said means being releasable, by the retractive movement of said interponent, for consequent movement to cause said part to be connected to said driver for a resultant case shift of said part from said normal position, and an operative connection between said means and interponent enabling the movement of said means consequent to the release thereof to insure retraction of said interponent independently of said key.

19. In a typewriter case shift mechanism, the combination with a part case shiftable from and back to a normal position, of a retractable interponent normally interposed to lock said part in normal position, a power operated driver, a case shift key, normally latched spring-urged means releasable by means of said key to move and thereby cause said part to be connected to said driver for a resultant case shift of said part from said normal position, and an operative connection between said means and said interponent enabling the movement of said means consequent to the release thereof to determine retraction of said interponent.

ALFRED G. F. KUROWSKI.